United States Patent Office 2,793,226
Patented May 21, 1957

2,793,226

HALOALKYL-CYANOBENZHYDRYL ETHERS AND METHOD OF PREPARING SAME

Albert Schlesinger, Jackson Heights, and Samuel M. Gordon, Forest Hills, N. Y., assignors to Endo Laboratories Inc., a corporation of New York No Drawing. Application July 1, 1955,
Serial No. 519,641

14 Claims. (Cl. 260—465)

This invention relates to halogenated ethers. More particularly, this invention relates to halo alkyl ethers of cyanobenzhydrol; and methods of preparing the same. These novel halo alkyl ethers of cyanobenzhydrol have the general molecular structure:

$$(phenyl)_2C(CN)-O-Alk-X$$

wherein Alk designates alkylene radicals, typified, for example, by the radicals —CH$_2$CH$_2$—, —CH$_2$CH$_2$CH$_2$—, —CH(CH$_3$)—CH$_2$—, —CH$_2$CH(CH$_3$)—; and X designates a chlorine or a bromine atom.

The customary methods of preparing halo alkyl ethers consist in reacting a metal alcoholate with a halohydrin to obtain a hydroxyalkyl ether which is then treated with thionyl chloride or a phosphorus halide to replace the hydroxyl radical by a halogen atom. This two-step method of producing halo alkyl ethers is not operable when working with cyanobenzhydrol.

It was also found that the more specialized method used when working with benzhydrol ethers, i. e., by heating benzhydryl halides with halohydrines under anhydrous conditions with alkaline reagents such as sodium or potassium carbonate, at temperatures above 100° C. is also completely unsatisfactory since no ethers are obtained by that route.

Other methods, such as the use of sulphuric acid as a condensation agent (Chem. Abstracts, 49, col. 5401 (1955)) do not result in the formation of the desired cyanobenzhydryl ethers.

It has now been discovered that halo alkyl ethers of cyanobenzhydrol may be obtained in excellent yields when halohydrins and cyanobenzhydryl halides are heated at temperatures not exceeding 65° C. with metal bicarbonates such as potassium or sodium bicarbonate.

An excess of the bicarbonate and the halohydrin are usually employed in order to ensure the total utilization of the cyanobenzhydryl halides. However, the proportions of the reagents employed are not important factors in order to achieve the production of the haloalkyl ethers. However, the reaction temperature should be at least 20° C. and not exceed 65° C., preferably being maintained in the range of from 35°–40° C., the reaction mixture being constantly mixed by agitation, stirring or shaking.

The novel haloalkyl cyanobenzhydryl ethers of this invention, are particularly useful as intermediates for the manufacture of compounds of the following general structure:

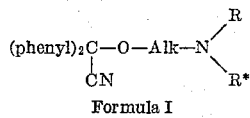

Formula I and

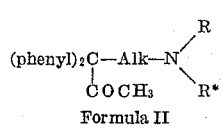

Formula II wherein R and R* designate alkyl radicals, as for example, methyl, ethyl, propyl, butyl, amyl and hexyl; or phenyl and benzyl radicals; and wherein the aforesaid alkyl radicals may be either straight-chain, branched, or cyclic in structure; and, further, wherein R and R* may constitute the terminal ends of a radical which, together with the nitrogen atom, constitutes a cyclic secondary amino group typified, for example, by piperidino, morpholino, pyrrolidino, piperazino, N-alkyl-piperazino, and the like.

Compounds of the general Formula I, supra, possess strong atropine and strong antihistaminic activity, particularly when Alk is a dimethylene radical (—CH$_2$CH$_2$—)

Compounds of the general Formula II, supra, possess strong anti-acetylcholine activity, particularly when Alk is a dimethylene radical (—CH$_2$CH$_2$—). They possess mild antihistaminic activity.

The compounds of this invention may be reacted with primary, secondary or tertiary amines such as methyl amine, dimethylamine, piperidine, pyrrolidine, trimethylamine, etc. to yield compounds of Formula I, supra, and related quaternaries.

Compounds of the general Formula II, supra, may be manufactured by using a Grignard reagent, as for example, by interacting magnesium methyl iodide with compounds of the Formula I, supra, to effectuate the conversion of the cyano radical into the acetyl radical.

The following are illustrative examples in accordance with the instant invention:

Example 1

2-chloroethyl-cyanobenzhydryl ether, having the formula:

$$(phenyl)_2C(CN)-O-CH_2-CH_2-Cl$$

A mixture of 227.5 grs. (grams) of alpha-chlorodiphenyl acetonitrile, 1,000 grs. of ethylene chlorohydrin and 110 grs. of potassium bicarbonate is stirred at 35° C.–40° C. for about 36 hours. Then, 1,000 cc. of ethyl ether is added thereto with stirring. After standing for two hours, the precipitate of potassium chloride is filtered off and washed with ether. The ether and the excess of the ethylene chlorohydrin are removed by distillation; and the residual 2-chloroethyl cyanobenzhydryl ether is purified by distillation in vacuo.

The boiling point thereof is 150° C.–155° C. at one millimeter pressure (mercury gauge). Yield equals 90%.

Example 2

2-bromoethyl-cyanobenzhydryl ether, having the formula:

$$(phenyl)_2C(CN)-O-CH_2-CH_2-Br$$

A mixture consisting of 316.19 grs. of alpha-bromodiphenylacetonitrile, 1,000 grs. of ethylene bromohydrin and 100 grs. of sodium bicarbonate is stirred at 35° C.–40° C. for about 40 hours. Then, 1000 cc. of ethyl ether is added to the reaction mixture with stirring. After standing for two hours at room temperature, the precipitated sodium bromide and the excess sodium bicarbonate is filtered off; and washed with ether. The ether and the excess ethylene bromohydrin are removed by distillation; and the residue distilled under vacuum to obtain the 2-bromoethyl-cyanobenzhydryl ether. The boiling point of this product is 165° C. at one millimeter pressure (mercury gauge). Yield is 80%.

Example 3

3-chloropropyl-cyanobenzhydryl ether, having the formula:

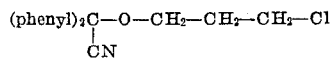

A mixture of 227.5 grs. of alpha-chlorodiphenyl-acetonitrile, 1,000 grs. of trimethylene chlorohydrin and 110 grs. of sodium bicarbonate is stirred at 35° C.–40° C. for about 40 hours. The mixture is then diluted with 1,000 cc. of ethyl ether; and the precipitated potassium chloride removed by filtration. The ether and the excess trimethylene chlorohydrin are removed from the filtrate by distillation; and the residue then distilled under reduced pressure to obtain the 3-chloropropyl-cyanobenzhydryl ether.

The boiling point of this product is 170° C. at one millimeter pressure (mercury gauge).

Example 4

A mixture of alpha and beta-chloropropyl-cyanobenzhydryl ethers, having the formulae:

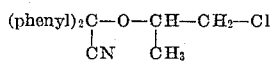

and

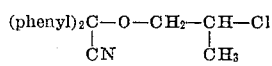

A mixture consisting of 227.5 grs. of alpha-chlorodiphenyl-acetonitrile, 1,000 grs. of chloropropanol (consisting of 75% of 1-chloro-2-propanol and 25% of 2-chloro-1-propanol) and 110 grs. of potassium bicarbonate is stirred at 35°–40° C. for about 50 hours. Then, 1,000 cc. of ethyl ether are added thereto and the precipitated potassium chloride removed by filtration and washed with ether. The ether and excess of the mixed chloropropanols are removed by distillation; and the residue then distilled under reduced pressure to obtain the mixture of alpha and beta-chloropropyl-cyanobenzhydryl ethers.

The mixture has a boiling point of 170° C.–175° C. at a pressure of one millimeter (mercury gauge).

It will be understood that the foregoing description of the invention and the examples set forth, are thoroughly illustrative of the principles thereof. Accordingly, the appended claims are to be constituted as defining the invention within the full spirit and scope thereof.

We claim:

1. Haloalkyl-cyanobenzhydryl ethers of the general formula:

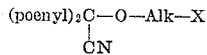

wherein Alk designates an alkylene radical having from 2 to 3 carbon atoms, and X designates a member of the group consisting of chlorine and bromine.

2. 2-bromoethyl-cyanobenzhydryl ether.
3. 2-chloroethyl-cyanobenzhydryl ether.
4. 3-chloropropyl-cyanobenzhydryl ether.
5. 1-chloro-2-propyl-cyanobenzhydryl ether.
6. 2-chloropropyl-cyanobenzhydryl ether.
7. Method of manufacturing haloalkyl-cyanobenzhydryl ethers of the formula:

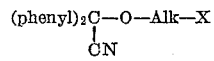

wherein Alk designates alkylene radical having from 2 to 3 carbon atoms and X designates a member of the group consisting of chlorine and bromine, which comprises interacting a halohydrin of the formula:

with an alkali metal bicarbonate and a cyanobenzhydryl halide of the formula:

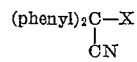

wherein the symbols Alk and X, in said interactants, have the significance above-defined, at a temperature of from about 20° C. to about 65° C., while agitating said reaction mixture, and removing the haloalkyl cyanobenzhydryl ether from the reaction mixture.

8. A process in accordance with claim 7, wherein the reaction is carried out in a temperature of from 35°–40° C.

9. A process of manufacturing 2-chloroethyl-cyanobenzhydryl ether which comprises interacting alpha-chlorodiphenyl-acetonitrile with ethylene chlorohydrin in the presence of an alkali metal bicarbonate at a temperature of about 30°–40° C.

10. A method of manufacturing 2-bromoethyl-cyanobenzhydryl ether which comprises reacting alpha-bromodiphenylacetonitrile with ethylene bromohydrin in the presence of alkali metal bicarbonate at a temperature of about 30°–40° C.

11. A method of manufacturing 3-chloropropyl-cyanobenzhydryl ether which comprises reacting alpha-chlorodiphenylacetonitrile with trimethylene-chlorohydrin in the presence of an alkali metal bicarbonate at a temperature of about 30°–40° C.

12. A method of manufacturing 1-chloro-2-propyl-cyanobenzhydryl ether which comprises reacting alpha-chlorodiphenyl-acetonitrile with 1-chloro-2-propanol in the presence of an alkali metal bicarbonate at a temperature of about 30°–40° C.

13. A method of manufacturing 2-chloropropyl-cyanobenzhydryl ether which comprises reacting alpha-chlorodiphenyl-acetonitrile with 2-chloro-1-propanol in the presence of an alkali metal bicarbonate at a temperature of about 30°–40° C.

14. A method of manufacturing haloalkyl cyanobenzhydryl ethers by the interaction of alpha-chloro-diphenyl-acetonitrile with an alkylene halohydrin having from 2 to 3 carbon atoms in the presence of an alkali metal bicarbonate at a temperature of from about 20° C. to 60° C.

References Cited in the file of this patent

UNITED STATES PATENTS 2,567,350   Rieveschl _____ Sept. 11, 1951